(12) United States Patent
Kim et al.

(10) Patent No.: US 11,082,196 B2
(45) Date of Patent: Aug. 3, 2021

(54) RESOURCE ALLOCATING METHOD IN WIRELESS NETWORK AND WIRELESS COMMUNICATION DEVICE USING THE SAME

(71) Applicant: ELECTRONICS AND TELECOMMUNICATIONS RESEARCH INSTITUTE, Daejeon (KR)

(72) Inventors: Seok Ki Kim, Daejeon (KR); Seung Kwon Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 421 days.

(21) Appl. No.: 16/225,505

(22) Filed: Dec. 19, 2018

(65) Prior Publication Data

US 2019/0280847 A1 Sep. 12, 2019

(30) Foreign Application Priority Data

Mar. 7, 2018 (KR) ........................ 10-2018-0027056

(51) Int. Cl.
*H04L 5/14* (2006.01)
*H04W 72/04* (2009.01)
(Continued)

(52) U.S. Cl.
CPC ........... *H04L 5/1461* (2013.01); *H04B 1/123* (2013.01); *H04B 1/525* (2013.01);
(Continued)

(58) Field of Classification Search
None
See application file for complete search history.

(56) References Cited

U.S. PATENT DOCUMENTS 9,750,025 B2 8/2017 Gunasekara et al.
2004/0156367 A1 8/2004 Albuquerque et al.
(Continued)

FOREIGN PATENT DOCUMENTS

WO WO-2008041650 A1 * 4/2008 ........... H04L 5/0007

OTHER PUBLICATIONS

Xuecai Bao et al., "Design of logical topology with K-connected constraints and channel assignment for multi-radio wireless mesh networks", International Journal of Communication Systems, 2017; 30: e2914.

*Primary Examiner* — Robert M Morlan
(74) *Attorney, Agent, or Firm* — LRK Patent Law Firm

(57) ABSTRACT

A resource allocating method in a wireless network performed by a first device positioned in a wireless communication network and connected to one or more second devices to constitute a fully connected link includes receiving network information from the wireless communication network, receiving information about a transmission scheme to be used for communication between the first device and the second device from the network information, obtaining information about the second device and an index of the first device, and allocating resources to be used for a communication between the first device and the one or more second devices using information related to at least one of the transmission scheme, the information about the second device, and the index of the first device.

20 Claims, 11 Drawing Sheets

(51) Int. Cl.
*H04W 80/02* (2009.01)
*H04B 1/525* (2015.01)
*H04W 72/12* (2009.01)
*H04B 1/12* (2006.01)

(52) U.S. Cl.
CPC ... *H04W 72/0446* (2013.01); *H04W 72/1263* (2013.01); *H04W 80/02* (2013.01)

(56) References Cited

U.S. PATENT DOCUMENTS

| | | |
|---|---|---|
| 2012/0093099 A1 | 4/2012 | Shin et al. |
| 2012/0294186 A1 | 11/2012 | Gloss |
| 2013/0223352 A1* | 8/2013 | Sartori ............... H04W 72/121 370/329 |
| 2014/0010138 A1 | 1/2014 | Flammer, III |
| 2014/0354478 A1* | 12/2014 | Umehara ............... H04B 7/086 342/367 |
| 2016/0007371 A1 | 1/2016 | Pietraski et al. |
| 2016/0150541 A1 | 5/2016 | Park et al. |
| 2017/0086081 A1* | 3/2017 | Kim ..................... H04W 4/027 |
| 2017/0135124 A1 | 5/2017 | Szymanski |
| 2018/0160284 A1* | 6/2018 | Lim ..................... H04L 61/2069 |
| 2020/0076535 A1* | 3/2020 | Xu ..................... H03M 13/2906 |

* cited by examiner

BC-BASED
TRANSMISSION
SCHEME

MAC-BASED
TRANSMISSION
SCHEME

K-USER IC-BASED
TRANSMISSION
SCHEME

SDD-BASED
TRANSMISSION
SCHEME

IBFD-BASED
TRANSMISSION
SCHEME

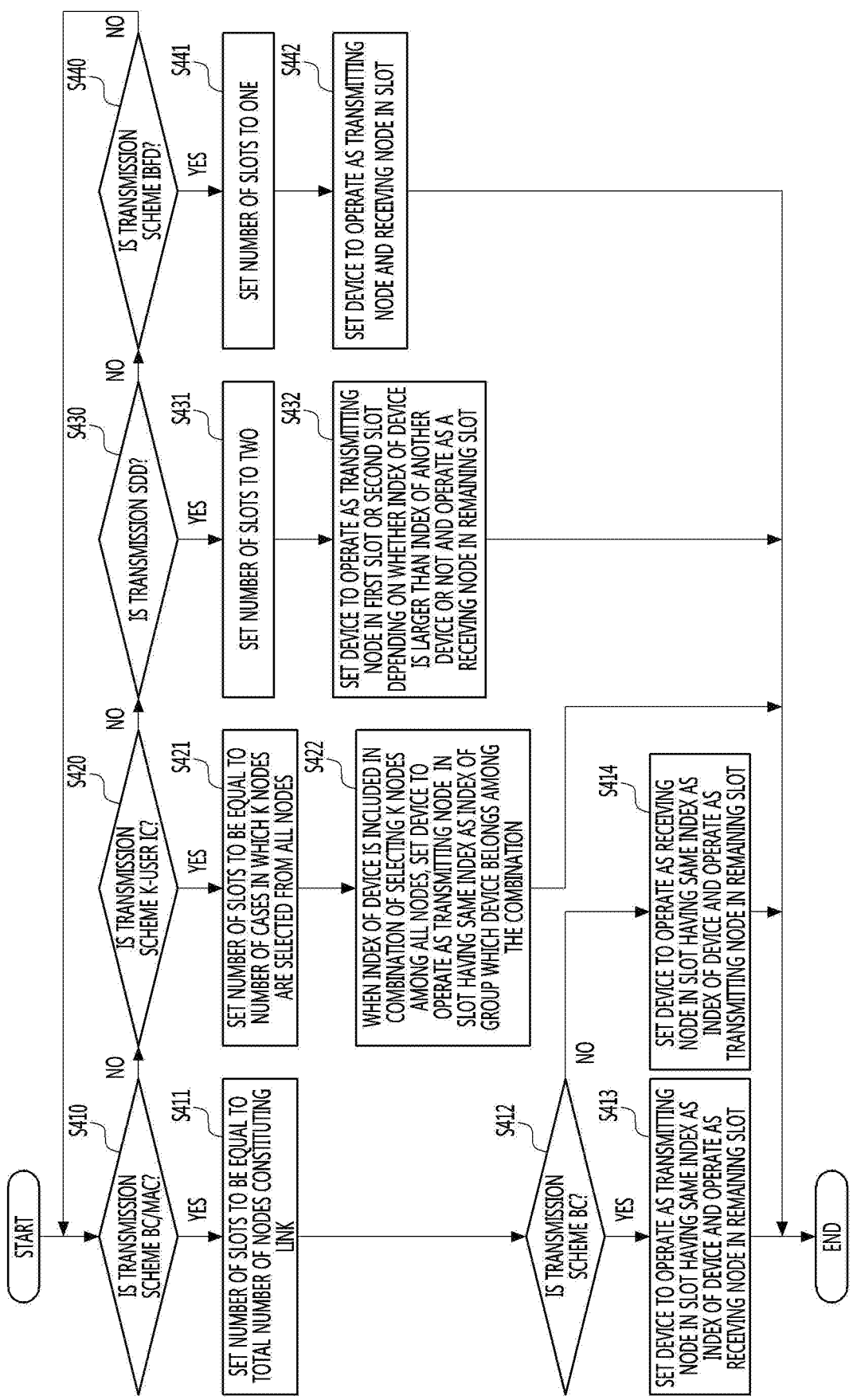

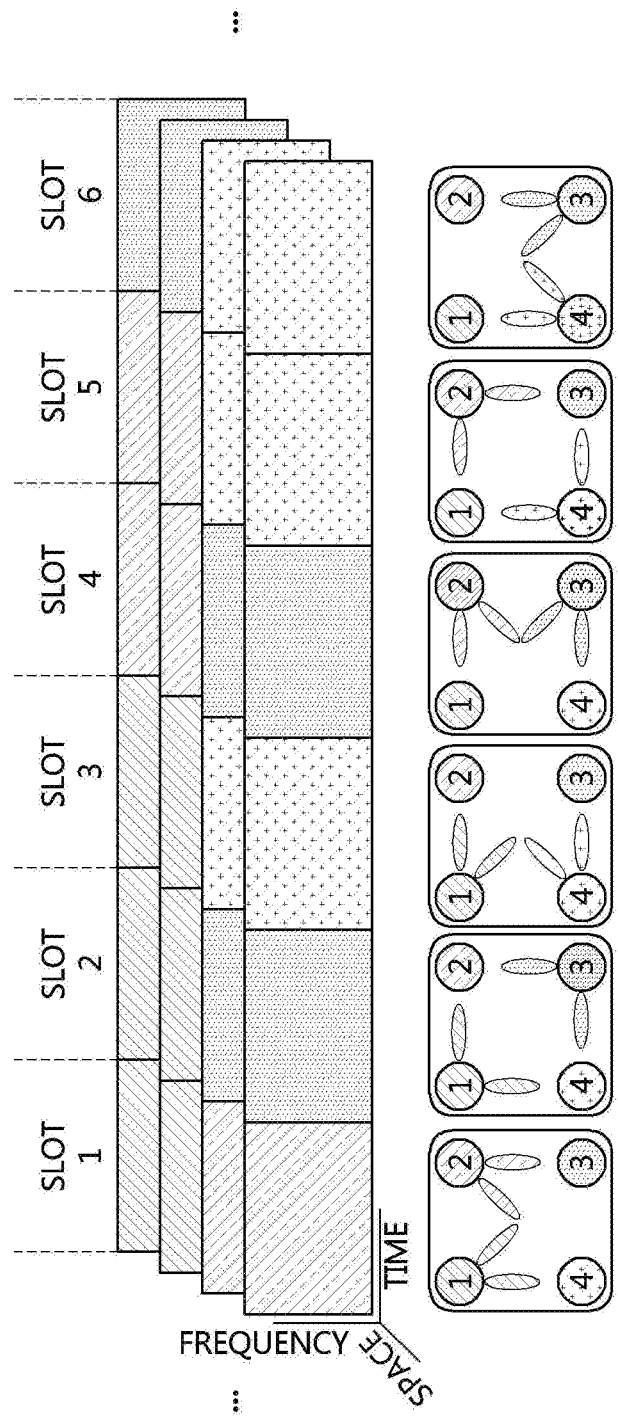

RESOURCE ALLOCATING METHOD IN WIRELESS NETWORK AND WIRELESS COMMUNICATION DEVICE USING THE SAME

CROSS REFERENCE TO RELATED APPLICATION

This application claims priority to Korean Patent Application No. 10-2018-0027056, filed Mar. 7, 2018 in the Korean Intellectual Property Office (KIPO), the entire content of which is hereby incorporated by reference.

BACKGROUND

1. Field of the Invention

The present invention relates to a resource allocating method in a wireless network and a wireless communication device using the same, and more specifically, to a resource allocating method capable of efficiently operating in a wireless backhaul of a network and a wireless communication device using the same.

2. Description of Related Art

In fifth generation communication systems, a high data transfer rate is one main requirement, and the maximum data transfer rate required in a radio access link is 20 Gbps. As a technology to achieve the transfer rate of 20 Gbps, ultra-wideband transmission technology using a millimeter wave band, a multi-input multi-output (MIMO) transmission technology using a large-scale antenna array, a full-duplex transmission technology, a network densification technology, and the like are being considered.

Accordingly, increasing a transfer rate of a backhaul network that supports connection between a radio access network (RAN) and a core network is also considered an important issue. However, the conventional construction of a backhaul network using an optical cable is expected to incur enormous costs for supporting network densification. Accordingly, studies on the wireless backhaul network using a millimeter wave frequency band have been actively conducted recently.

Generally, the millimeter wave band has low channel characteristics due to large path loss, blockage, and the like caused by the physical characteristics of the corresponding frequency band. Accordingly, there is a need for efficient network architecture and transmission method capable of improving the low channel characteristics when using millimeter waves in a wireless backhaul of a network.

SUMMARY

Accordingly, example embodiments of the present invention are provided to substantially obviate one or more problems due to limitations and disadvantages of the related art.

Example embodiments of the present invention provide a resource allocating method in a wireless network that is applicable to a wireless backhaul of a network.

Example embodiments of the present invention also provide a wireless communication device using the resource allocating method in the wireless network.

In some example embodiments, a resource allocating method in a wireless network performed by a first device positioned in a wireless communication network and connected to one or more second devices to constitute a fully connected link includes receiving network information from the wireless communication network, receiving information about a transmission scheme to be used for communication between the first device and the second device from the network information, obtaining information about the second device and an index of the first device, and allocating resources to be used for communication between the first device and the one or more second devices using information related to at least one of the transmission scheme, the information about the second device, and the index of the first device.

The allocating of the resources to be used for the communication between the first device and the one or more second devices may include determining a number of slots to be included in a unit time section using at least one of the transmission scheme and a total number of nodes constituting the fully connected link and determining whether the first device operates as a transmitting node or a receiving node in each slot in the unit time section using at least one of the transmission scheme, the information about the second device, and the index of the first device.

The transmission scheme may include at least one of a broadcast channel (BC)-based transmission scheme, a multiple access channel (MAC)-based transmission scheme, a K-user interference channel (K-User IC)-based transmission scheme, a space division duplex (SDD)-based transmission scheme, and an in-band full duplex (IBFD)-based transmission scheme.

The allocating of the resources to be used for the communication between the first device and the one or more second devices may include, when using the BC-based transmission scheme, setting a number of slots included in a unit time section to be equal to a total number of nodes constituting the fully connected link and setting the first device to operate as a transmitting node in a slot having the same index as an index of the first device and operate as a receiving node in remaining slots in the unit time section.

The allocating of the resources to be used for the communication between the first device and the one or more second devices may include, with respect to the MAC-based transmission scheme, setting a number of slots included in a unit time section to be equal to a total number of nodes constituting the fully connected link and setting the first device to operate as a receiving node in a slot having the same index as an index of the first device and operate as a transmitting node in remaining slots in the unit time section.

The allocating of the resources to be used for the communication between the first device and the one or more second devices may include, with respect to the K-User IC-based transmission scheme, setting a number of slots included in a unit time section to be equal to a number of cases in which K nodes are selected from all nodes constituting the fully connected link and setting, when the index of the first device is included in a combination of selecting the K nodes among all the nodes constituting the fully connected link, the first device to operate as a transmitting node in a slot having the same index as an index allocated to a group to which the device belongs among the combination and operates as a receiving node in remaining slots. K devices may operate as transmitting nodes in a single slot according to the K-User IC-based transmission scheme.

The allocating of the resources to be used for the communication between the first device and the one or more second devices may include, with respect to the SDD-based transmission scheme, setting two slots including a first slot and a second slot in a unit time section and setting the first device to operate as a transmitting node in the first slot or the second slot depending on whether the index of the first device is larger than an index of the second device or not.

The setting of the first device to operate as a transmitting node in the first slot or the second slot may include setting the first device to operate as a transmitting node when the index of the first device is smaller than the index of the second device in the first slot and setting the first device to operate as a receiving node when the index of the first device is smaller than the index of the second device in the second slot.

The allocating of the resources to be used for the communication between the first device and the one or more second devices may include, with respect to the IBFD-based transmission scheme, setting a single slot in a unit time section and setting the first device to operate as a transmitting node and a receiving node with respect to all of the one or more second devices in the slot.

In other example embodiments, a wireless communication device includes a processor and a memory configured to store at least one command to be executed through the processor. The wireless communication device may include a communication module for communication with another device.

The at least one command may include a command for receiving network information from the wireless communication network, a command for receiving information about a transmission scheme to be used for communication with the other device from the network information, a command for obtaining information about the other device and an index of the wireless communication device, and a command for allocating resources to be used for communication with the other device using information related to at least one of the transmission scheme, the information about the other device, and the index of the wireless communication device.

The command for allocating the resources to be used for the communication with the other device may include a command for determining a number of slots to be included in a unit time section using at least one of the transmission scheme and a total number of nodes constituting the fully connected link and include a command for determining whether the wireless communication device operates as a transmitting node or a receiving node in each slot in the unit time section using at least one of the transmission scheme, the information about the other device, and the index of the wireless communication device.

The transmission scheme may include at least one of a BC-based transmission scheme, a MAC-based transmission scheme, a K-User IC-based transmission scheme, an SDD-based transmission scheme, and an IBFD-based transmission scheme.

The command for allocating the resources to be used for the communication with the other device may include, with respect to the BC-based transmission scheme, a command for setting a number of slots included in a unit time section to be equal to a total number of nodes constituting the fully connected link and include a command for setting the wireless communication device to operate as a transmitting node in a slot having the same index as an index of the wireless communication device and operate as a receiving node in remaining slots in the unit time section.

The command for allocating resources to be used for the communication with the other device may include, with respect to the MAC-based transmission scheme, a command for setting a number of slots included in a unit time section to be equal to a total number of nodes constituting the fully connected link and include a command for setting the wireless communication device to operate as a receiving node in a slot having the same index as an index of the wireless communication device and operate as a transmitting node in remaining slots in the unit time section.

The command for allocating the resources to be used for the communication with the other device may include, with respect to the K-User IC-based transmission scheme, a command for setting a number of slots included in a unit time section to be equal to a number of cases in which K nodes are selected from all nodes constituting the fully connected link and include a command for setting, when the index of the wireless communication device is included in a combination of selecting the K nodes among all the nodes constituting the fully connected link, the wireless communication device to operate as a transmitting node in a slot having the same index as an index allocated to a group to which the device belongs among the combination and operates as a receiving node in remaining slots.

The command for allocating the resources to be used for the communication with the other device may include, with respect to the SDD-based transmission scheme, a command for setting two slots including a first slot and a second slot in a unit time section, and include a command for setting the wireless communication device to operate as a transmitting node in the first slot or the second slot depending on whether the index of the wireless communication device is larger than an index of the other device or not.

The command for setting the wireless communication device to operate as a transmitting node in the first slot or the second slot may include a command for setting the wireless communication device to operate as a transmitting node when the index of the wireless communication device is smaller than the index of the other device in the first slot and include a command for setting the wireless communication device to operate as a receiving node when the index of the wireless communication device is smaller than the index of the other device in the second slot.

The command for allocating the resources to be used for the communication with the other device may include, with respect to the IBFD-based transmission scheme, a command for setting a single slot in a unit time section and include a command for setting the wireless communication device to operate as a transmitting node and a receiving node with respect to all of the other devices in the slot.

The wireless communication device may include at least one of a terminal, a base station, and a relay.

BRIEF DESCRIPTION OF DRAWINGS

Example embodiments of the present invention will become more apparent by describing example embodiments of the present invention in detail with reference to the accompanying drawings, in which:

FIG. 4 is a diagram showing a method of allocating wireless resources for different transmission schemes according to an embodiment of the present invention;

FIG. 7B is a diagram illustrating resources allocated for each slot in a BC-based transmission scheme according to the embodiment of the present invention;

DETAILED DESCRIPTION OF EXAMPLE EMBODIMENTS

Figure 1:
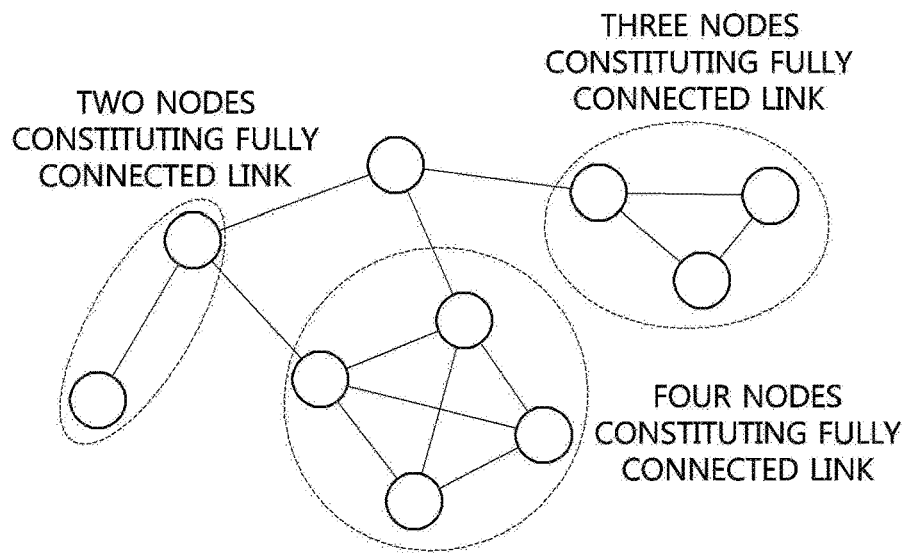
FIG. 1 is a conceptual diagram illustrating a plurality of nodes constituting a fully connected link to which the present invention may be applied.

While the present invention is susceptible to various modifications and alternative embodiments, specific embodiments thereof are shown by way of example in the drawings and will be described in detail. However, it should be understood that there is no intention to limit the present invention to the particular forms disclosed, rather the present invention is to cover all modifications, equivalents, and alternatives falling within the spirit and scope of the present invention. Like numbers refer to like elements throughout the description of the drawings.

It will be understood that, although the terms first, second, A, B, etc. may be used herein to describe various elements, the elements should not be limited to the terms. The terms are only used to distinguish one element from another. For example, a first element could be termed a second element, and, similarly, a second element could be termed a first element, without departing from the scope of the present invention. As used herein, the term "and/or" includes any one or combinations of the associated listed items or any item of one or more of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a conceptual diagram illustrating a plurality of nodes constituting a fully connected link to which the present invention may be applied.

The present invention concerns a mesh-type network connection structure and a multi-hop transmission in order to improve reliability and expand coverage of a wireless backhaul network. FIG. 1 illustrates a concept of network architecture for supporting a mesh-type network connection structure and a multi-hop transmission to which the present invention may be applied, and embodiments of the present invention are provided assuming a fully connected link configuration between a plurality of nodes as shown in FIG. 1. In FIG. 1, two nodes constituting a fully connected link, three nodes constituting a fully connected link, and four nodes constituting a fully connected link are illustrated.

In the specification, a node may refer to a wireless communication device.

In the specification, the wireless communication device may refer to a base station (BS), and may refer to not only a base station but also an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (ARS) serving as a base station, a high reliability relay station (HR-RS) serving as a base station, a small base station (femto BS, a home node B (HNB), a home eNodeB (HeNB), a pico BS, a metro BS, or a micro BS), and the like, and may include all or some features thereof. In addition, the base station may refer to such base stations as a macro cell, a remote radio head (RRH) cell, a picocell, a microcell, a femtocell, and the like according to the form of a cell.

The wireless communication device may also refer to a terminal, a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and the like, and may include all or some features thereof.

The present invention proposes a transmission scheme that may be considered in a wireless network having a mesh structure and allowing multi-hop transmission. As examples of the transmission scheme, a broadcast channel (BC)-based transmission scheme, a multiple access channel (MAC)-based transmission scheme, a K-user interference channel (K-User IC)-based transmission scheme, a space division duplex (SDD)-based transmission scheme, and an in-band full duplex (IBFD)-based transmission scheme are taken in consideration of a duplexing scheme, a degree of freedom of transmission, and an interference environment for wireless transmission of each node having a large-scale antenna array.

Figure 2A:
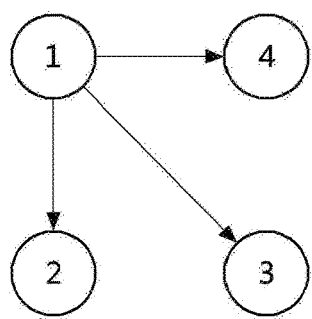
FIG. 2A is a conceptual diagram illustrating a broadcast channel (BC)-based transmission scheme according to an embodiment of a wireless transmission scheme to which the present invention may be applied.

FIG. 2A illustrates a concept of a BC-based transmission scheme according to an embodiment of the wireless transmission scheme to which the present invention may be applied.

In the BC based transmission scheme, one node operates as a transmitting node and the remaining nodes operate as receiving nodes in a single time section. Referring to FIG. 2A, it can be seen that node 1 operates as a transmitting node, and nodes 2, 3, and 4 operate as receiving nodes.

Figure 2B:
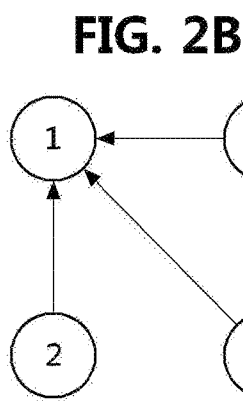
FIG. 2B is a conceptual diagram illustrating a multiple access channel (MAC)-based transmission scheme according to an embodiment of a wireless transmission scheme to which the present invention may be applied.

FIG. 2B illustrates a concept of a MAC-based transmission scheme according to an embodiment of the wireless transmission scheme to which the present invention may be applied.

In the MAC-based transmission scheme, one node operates as a receiving node and the remaining nodes operate as transmitting nodes in a single time section. Referring to FIG. 2B, it can be seen that node 1 operates as a receiving node and nodes 2, 3, and 4 operate as transmitting nodes.

Figure 2C:
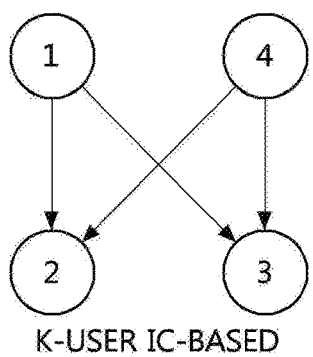
FIG. 2C is a conceptual diagram illustrating a K-user interference channel (K-User IC)-based transmission scheme as an embodiment of a wireless transmission scheme to which the present invention may be applied.

FIG. 2C illustrates a concept of a K-User IC-based transmission scheme according to an embodiment of the wireless transmission scheme to which the present invention may be applied.

The K-User IC-based transmission scheme is a transmission scheme in which K users or K connections are allowable in a single time section (e.g., a slot). FIG. 2C illustrates a case in which a 2-User IC-based transmission scheme is used. Referring to FIG. 2C, two users, that is, node 1 and node 4, operate as transmitting nodes, and node 2 and node 3 operate only as receiving nodes. In an example different from the case shown in FIG. 2C, node 1 and node 2 may be selected as transmitting nodes and node 3 and node 4 may operate as receiving nodes. In addition, transmission schemes, such as a 2-User IC-based transmission scheme, a 3-User IC-based transmission scheme, and a 4-User IC-based transmission scheme, may be used depending on the number of users in a single time section.

Figure 2D:
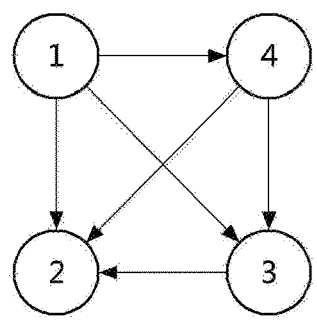
FIG. 2D is a conceptual diagram illustrating a space division duplex (SDD)-based transmission scheme according to an embodiment of a wireless transmission scheme to which the present invention may be applied.

FIG. 2D illustrates a concept of an SDD-based transmission scheme according to an embodiment of the wireless transmission scheme to which the present invention may be applied.

Since the SDD-based transmission scheme uses a space division communication scheme, each node establishes a transmission or reception relationship with all other nodes except for the node itself. Referring to FIG. 2D, node 4 has a transmission relationship or a reception relationship with node 1, node 2, and node 3 while operating as a receiving node for node 1 and operating as a transmitting node for node 2 and node 3.

Figure 2E:
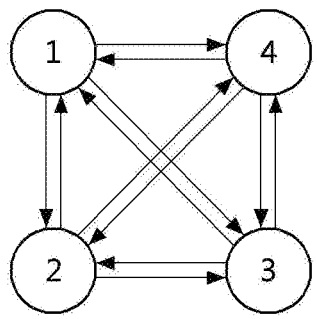
FIG. 2E is a conceptual diagram illustrating an in-band full duplex (IBFD)-based transmission scheme according to an embodiment of a wireless transmission scheme to which the present invention may be applied.

FIG. 2E illustrates a concept of an IBFD-based transmission scheme according to an embodiment of the wireless transmission scheme to which the present invention may be applied.

In the IBFD-based transmission scheme, a node is usable for simultaneously performing a transmission operation and a reception operation with respect to all other nodes in a single time section so that a communication relationship is established between every available pair of nodes in a link.

Referring to FIGS. 2A to 2E, when N nodes of a link constitute a fully connected link, a restriction on the configuration of a specific inter-node link may occur depending on the wireless transmission scheme. Accordingly, resource allocation information of each node needs to be shared among all the nodes, or a centralized resource allocation may be needed.

In addition, a need to update resource allocation information of each node constituting a fully connected link may arise due to a network connection of a new node, a disconnection of an existing node, and a great change in channel state. Accordingly, there is a need for an efficient resource allocating method capable of reducing control overhead for resource allocation and performing rapid application of changed resource allocation information.

Figure 3:
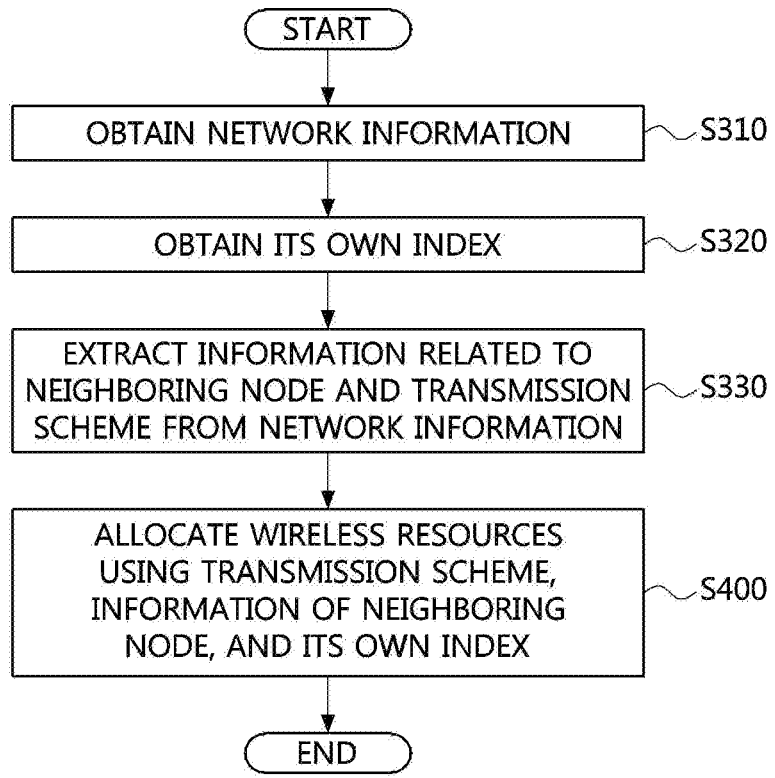
FIG. 3 is a diagram showing a wireless resource allocating method performed at each node according to an embodiment of the present invention.

FIG. 3 illustrates a wireless resource allocating method performed by each node according to an embodiment of the present invention.

The embodiment illustrated in FIG. 3 relates to a resource allocating method performed by a node positioned in a wireless network, and the node constitutes a fully connected link in connection with one or more other nodes.

Referring to FIG. 3, the node receives network information from the network (S310) and obtains an index of the node (S320).

In this case, a node attempting a connection to the wireless network obtains the network information through a procedure including a synchronization signal detection, a system information reception, a search, a control message reception, and the like. Here, the network information may include information related to at least one of synchronization information, a transmission scheme, a slot number, the number of nodes constituting a fully connected link, a state of a channel established with a neighboring node, an index of a neighboring node, and an index of the node (i.e., the corresponding node).

When the index information of the corresponding node is included in the network information, it is considered that the centralized control is performed. Accordingly, in this case, the corresponding node may extract its own index included in the network information. On the other hand, when the index of the corresponding node is not included in the network information, the corresponding node obtains its own index through calculation using the received network information.

In addition, the corresponding node extracts information about the transmission scheme to be used for a communication with the neighboring node constituting the link and information about the neighboring node from the received network information (S330).

The corresponding node allocates wireless resources to be used for communication with the neighboring node using the information related to at least one of the extracted transmission scheme, the information about the neighboring node, and the index of the corresponding node (S400).

Here, the corresponding node may use various communication determination methods when allocating wireless resource information to be used for communication with the neighboring node.

In detail, in the allocating of wireless resources, the number of slots to be included in a unit time section is determined using at least one of the transmission scheme and the total number of nodes constituting the fully connected link, and whether a corresponding node operates as a transmitting node or a receiving node in each slot in the unit time section is determined using at least one of the transmission scheme, information about a neighboring node, and an index of a device. Resource allocation for each node constituting a fully connected link is determined on the basis of the index of the corresponding node and the index of the neighboring node.

For example, when indexes of nodes are denoted with i and j and a conditional expression defined by a transmission scheme between the nodes is denoted with $f_m(x, y)$ (herein, m is a transmission scheme), the wireless resource allocating method according to the embodiment of the present invention may be expressed as Equation 1 below.

if $f_m(i,j)$==TRUE, node $i$ Tx and node $j$ Rx else $f_m(i,j)$==FALSE, node $i$ Rx and node $j$ Tx [Equation 1]

Referring to Equation 1, wireless resources may be allocated such that an $i^{th}$ node is set as a transmitting node and a $j^{th}$ node is set as a receiving node when the conditional expression $f_m(i, j)$ is satisfied for the node indexes i and j, and conversely, the $i^{th}$ node is set as a receiving node and the $j^{th}$ node is set as a transmitting node when the conditional expression $f_m(i, j)$ is not satisfied for the node indexes i and j.

That is, the present invention may determine a transmitting node and a receiving node on the basis of a function or a conditional expression defined in advance according to node indexes and a transmission scheme and allocate wireless resources.

FIG. 4 illustrates a method of allocating wireless resources for different transmission schemes according to an embodiment of the present invention.

The method of allocating wireless resources shown in FIG. 4 represents detailed operations of the allocating of wireless resources (S400) described with reference to FIG. 3 and describes a method of allocating wireless resources by a node in different transmission schemes.

Referring to FIG. 4, a device (or a node) determines whether the transmission scheme extracted from the network information is a BC-based transmission scheme, a MAC-based transmission scheme, or any other transmission scheme (S410).

When the transmission scheme is a BC-based transmission scheme or a MAC-based transmission scheme (YES in S410), the device sets the number of slots included in a unit time section to be equal to the total number of nodes constituting a fully connected link (S411). When the transmission scheme is a BC-based transmission scheme (YES in S412), the device sets the device to operate as a transmitting node in a slot having the same index as an index of the device and operate as a receiving node in the remaining slots (S413). On the other hand, when the transmission scheme is not a BC-based transmission scheme (NO in S412), that is, when the transmission scheme is a MAC-based transmission scheme, the device sets the device to operate as a receiving node in a slot having the same index as an index of the device and operate as a transmitting node in the remaining slots (S414).

Returning to the determination of the transmission scheme S410, when the transmission scheme is not a BC-based transmission scheme or a MAC-based transmission scheme (NO in S410), whether the transmission scheme is a K-User IC-based transmission scheme (S420), an SDD-based transmission scheme (S430), or an IBFD-based transmission scheme (S440) is determined.

When the transmission scheme is a K-User IC-based transmission scheme (S420), the device sets the number of slots included in a unit time section to be equal to the number of cases in which K nodes are selected from all nodes constituting a fully connected link (S421), and when the index of the device is included in a combination of selecting the K nodes among all the nodes constituting the fully connected link, the device sets the device to operate as a transmitting node in a slot having the same index as an index allocated to a group to which the device belongs among the combination and operate as a receiving node in the remaining slots (S422).

When the transmission scheme is an SDD-based transmission scheme (S430), the device sets two slots including a first slot and a second slot in a unit time section (S431) and sets the device to operate as a transmitting node in the first slot or the second slot depending on whether the index of the corresponding device is larger than an index of another device or not (S432).

For example, when the index of the corresponding device in the first slot is smaller than the index of another device, the corresponding device may set the corresponding device to operate as a transmitting node. In addition, when the index of the corresponding device is smaller than the index of another device in the second slot, the corresponding device may set the corresponding device to operate as a receiving node.

When the transmission scheme is an IBFD-based transmission scheme (S440), the corresponding device sets only a single slot in a unit time section (S441) and sets the corresponding device to operate as a transmitting and receiving node with respect to all the remaining nodes in the slot (S442). In other words, each of node 1, node 2, node 3, and node 4 constituting the fully connected link may operate as a transmitting node and a receiving node with respect to all the remaining nodes as shown in FIG. 2E.

Figure 5A:
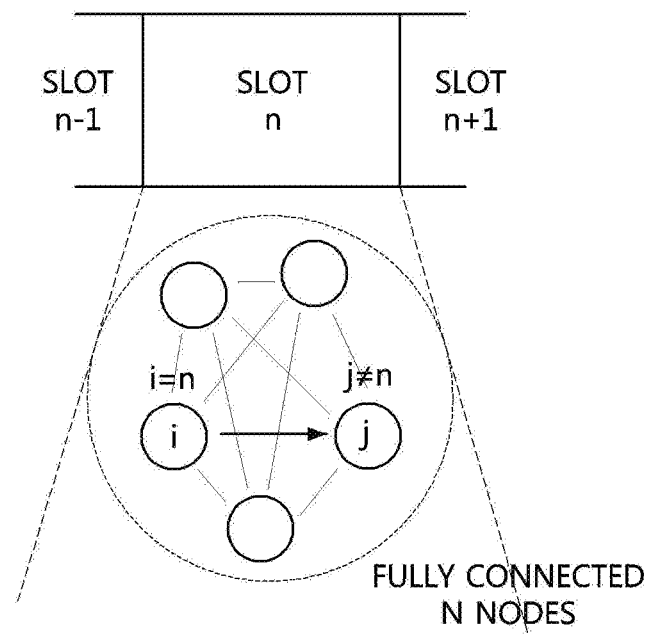
FIG. 5A is a diagram conceptually illustrating a resource allocating method in a BC-based transmission scheme according to an embodiment of the present invention.
Figure 5B:
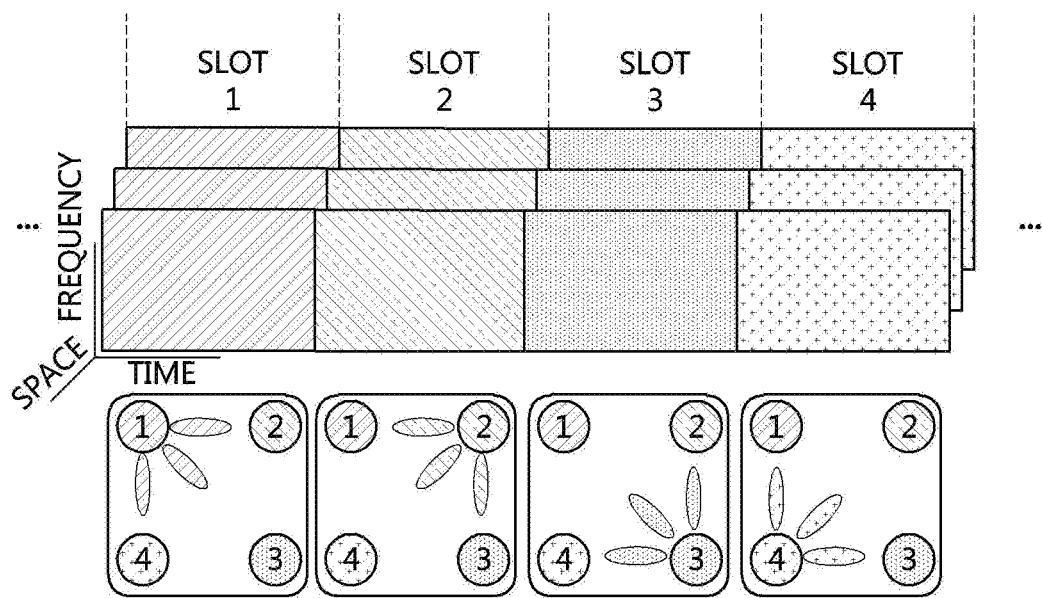
FIG. 5B is a diagram illustrating resources allocated for each slot in a BC-based transmission scheme according to the embodiment of the present invention.

FIG. 5A is a diagram conceptually illustrating a resource allocating method in a BC-based transmission scheme according to an embodiment of the present invention, and FIG. 5B is a diagram illustrating resources allocated for each slot in a BC-based transmission scheme according to the embodiment of the present invention.

Referring to FIG. 5A, N nodes constituting a fully connected link each have a different index among integers greater than or equal to 1 and less than or equal to N. Wireless resources are divided between N slots for a specific time section. In an $n^{th}$ slot, when an $i^{th}$ node among the N nodes constituting the fully connected link has an index of 'n' and a $j^{th}$ node does not have an index of 'n', the $i^{th}$ node operates as a transmitting node, and the $j^{th}$ node operates as a receiving node as shown in FIG. 5A. Accordingly, in the BC-based transmission scheme, the nodes sequentially occupy the wireless resources divided between the N slots for the specific time section.

FIG. 5B illustrates a slot-specific resource allocating method for a fully connected link configuration between four nodes in a BC-based transmission scheme. Referring to FIG. 5B, in each slot, only one node operates as a transmitting node and all the remaining nodes operate as receiving nodes.

Figure 6A:
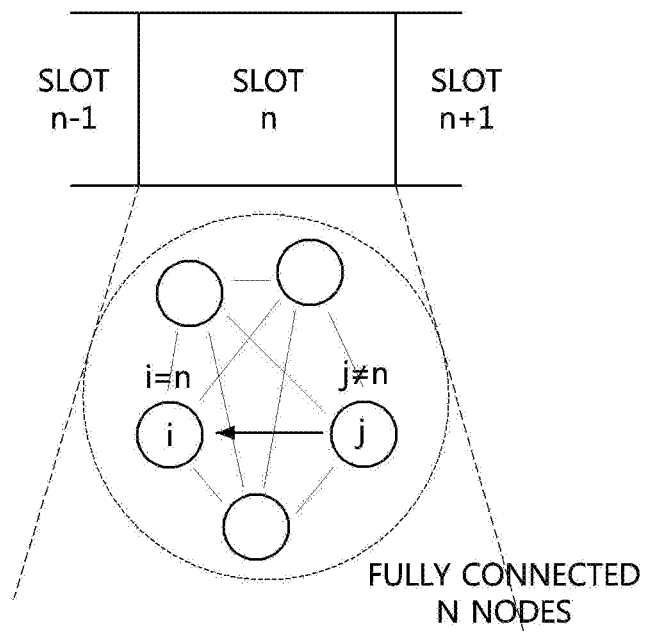
FIG. 6A is a diagram conceptually illustrating a resource allocating method in a MAC-based transmission scheme according to an embodiment of the present invention.
Figure 6B:
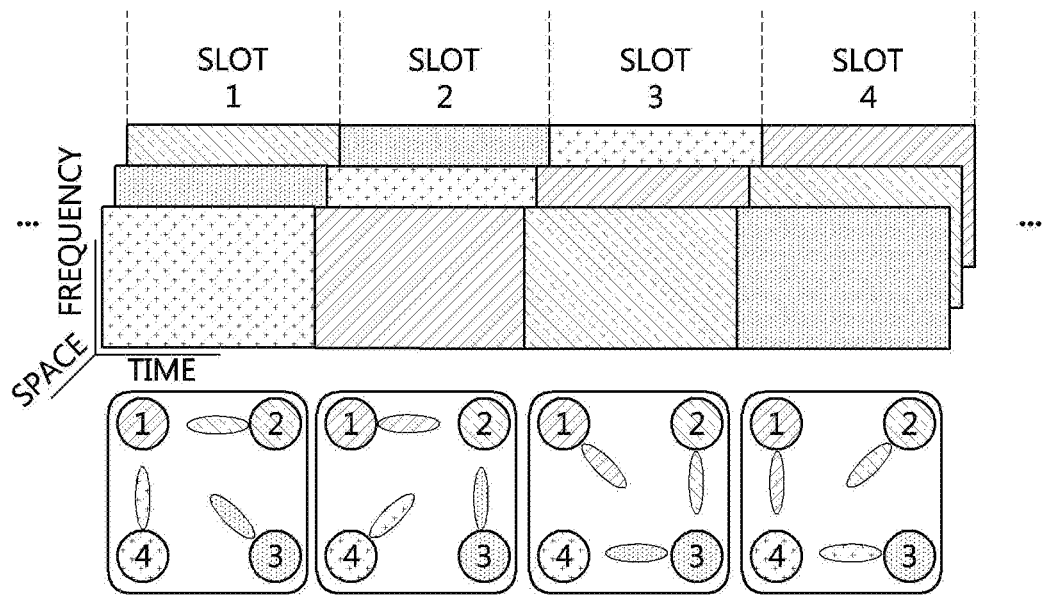
FIG. 6B is a diagram illustrating resources allocated for each slot in a MAC-based transmission scheme according to the embodiment of the present invention.

FIG. 6A is a diagram conceptually illustrating a resource allocating method in a MAC-based transmission scheme according to an embodiment of the present invention, and FIG. 6B is a diagram illustrating resources allocated for each slot in a MAC-based transmission scheme according to the embodiment of the present invention.

Referring to FIG. 6A, N nodes constituting a fully connected link each have a different index among integers greater than or equal to 1 and less than or equal to N. The wireless resource is divided between N slots for a specific time section. In an $n^{th}$ slot, when an $i^{th}$ node among the N nodes constituting the fully connected link has an index of 'n' and a $j^{th}$ node does not have an index of 'n', the $i^{th}$ node performs a receiving operation and the $j^{th}$ node performs a transmitting operation as shown in FIG. 6A. Accordingly, the nodes sequentially occupy the wireless resources divided between the N slots during the specific time section.

FIG. 6B illustrates a slot-specific resource allocating method for a fully connected link configuration between four nodes in a MAC-based transmission scheme. Referring to FIG. 6B, in each slot, three nodes operate as transmitting nodes, and only one node operates as a receiving node that receives all data transmitted from the three nodes.

Figure 7A:
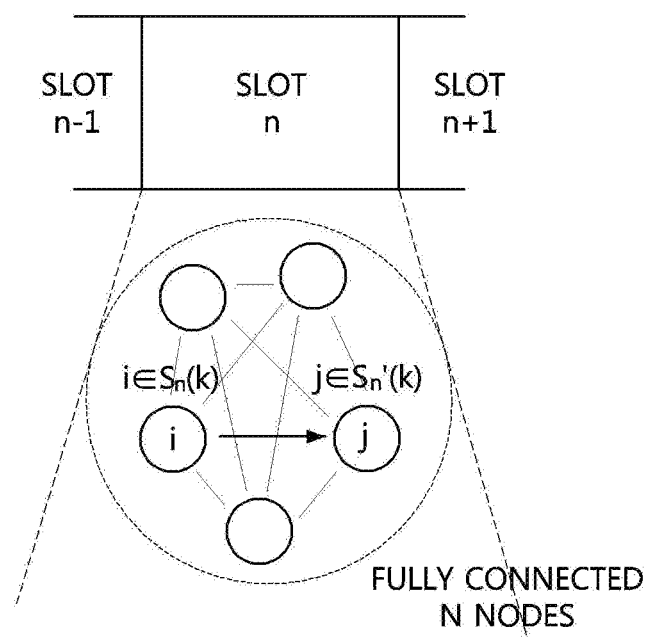
FIG. 7A is a diagram conceptually illustrating a resource allocating method in a K-User IC-based transmission scheme according to an embodiment of the present invention.

FIG. 7A is a diagram conceptually illustrating a resource allocating method in a K-User IC-based transmission scheme according to an embodiment of the present invention, and FIG. 7B is a diagram illustrating resources allocated for each slot in a K-User IC based transmission scheme according to the embodiment of the present invention.

Referring to FIG. 7A, in the K-User IC-based transmission scheme, N nodes constituting a fully connected link each have a different index among integers greater than or equal to 1 and less than or equal to N.

Meanwhile, in the K-User IC-based transmission scheme, wireless resources are divided between $_NC_K$ slots for a specific time section. In an $n^{th}$ slot, when an $i^{th}$ node among the N nodes constituting the fully connected link has an index corresponding to an element of a set $S_n(K)$ and a $j^{th}$ node has an index corresponding to an element of a set $S_n'(K)$, the $i^{th}$ node performs a transmitting operation, and the $j^{th}$ node performs a receiving operation as shown in FIG. 7A.

Here, K is an integer greater than 1 and less than N which is set by referring to channel state information with neighboring nodes. $_NC_K$ represents the number of combinations of selecting K different elements from a set having N elements. $S_n(K)$ represents a subset including, as an element, an $n^{th}$ combination among the combinations of selecting K elements from the set having integers greater than or equal to 1 and less than or equal to N as elements. $S_n'(K)$ represents the complement of $S_n(K)$.

Accordingly, nodes of each combination, which have the K elements, sequentially occupy the wireless resources divided between the $_NC_K$ slots during the specific time section. In other words, the total number of combinations is equal to $_NC_K$, and each combination occupies one slot and K elements, that is, K nodes belonging to the combination are selected as transmitting nodes in the corresponding slot.

FIG. 7B illustrates a slot-specific resource allocating method for a fully connected link configuration between four nodes in a 2-User IC-based transmission scheme. Referring to FIG. 7B, the total number of slots is 6($_4C_2$=6), slot 1 is occupied by set 1={1,2}, slot 2 is occupied by set 2={1,3}, slot 3 is occupied by set 3={1,4}, slot 4 is occupied by set 4={2,3}, slot 5 is occupied by set 5={2,4}, and slot 6 is occupied by set 6={3,4}.

Figure 8A:
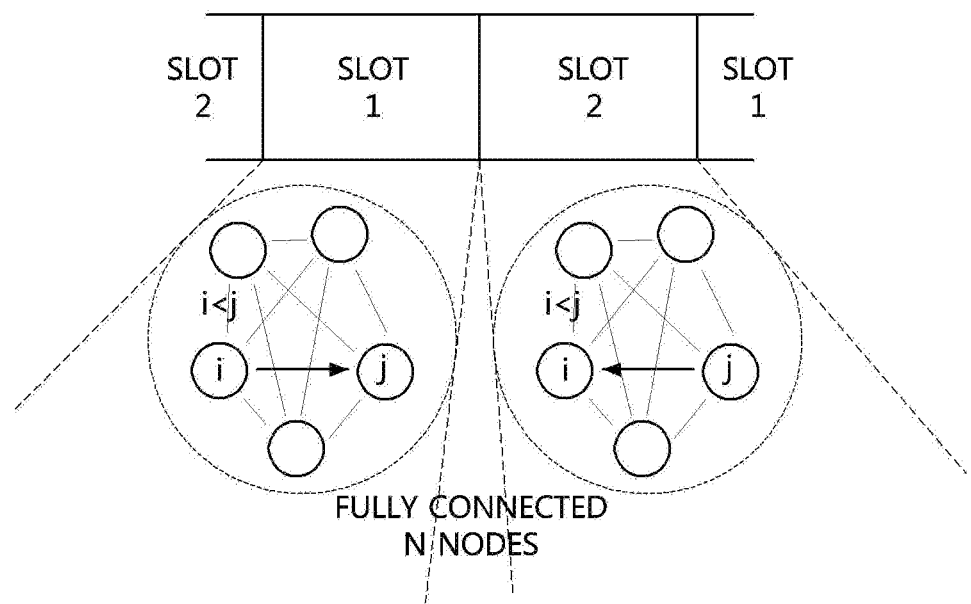
FIG. 8A is a diagram conceptually illustrating a resource allocating method in an SDD-based transmission scheme according to an embodiment of the present invention.
Figure 8B:
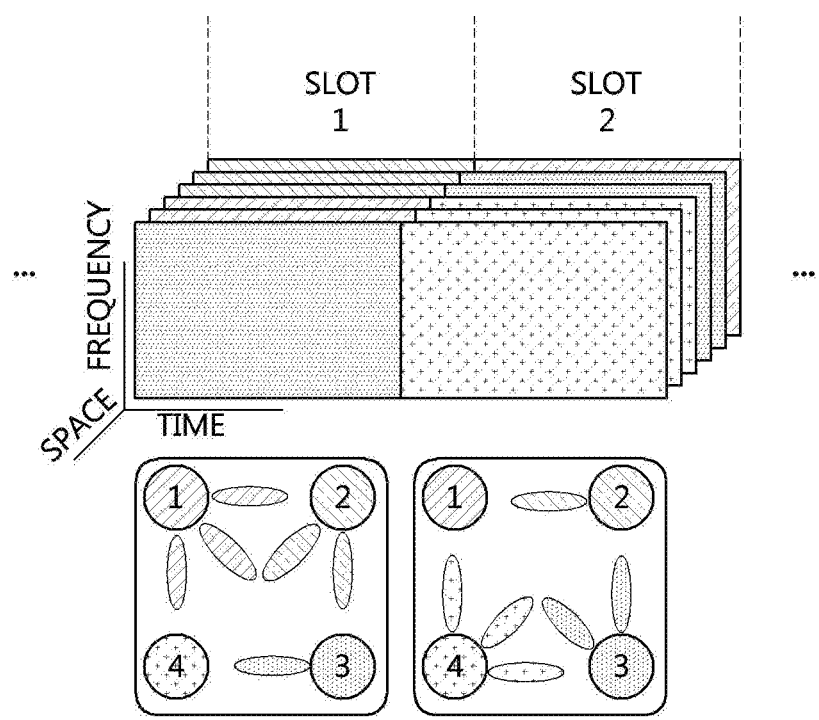
FIG. 8B is a diagram illustrating resources allocated for each slot in an SDD-based transmission scheme according to the embodiment of the present invention.

FIG. 8A is a diagram conceptually illustrating a resource allocating method in an SDD-based transmission scheme according to an embodiment of the present invention, and FIG. 8B is a diagram illustrating resources allocated for each slot in an SDD-based transmission scheme according to the embodiment of the present invention.

Referring to FIG. 8A, N nodes constituting a fully connected link each have a different index among integers greater than or equal to 1 and less than or equal to N.

In the SDD-based transmission scheme, wireless resources are divided between two slots for a specific time section. In the first slot, when an $i^{th}$ node among the N nodes constituting the fully connected link has an index smaller than an index of a $j^{th}$ node, the $i^{th}$ node performs a transmitting operation and the $j^{th}$ node performs a receiving operation as shown in FIG. 8A. In the second slot, when the $i^{th}$ node among the N nodes constituting the fully connected link has an index smaller than an index of the $j^{th}$ node, the $i^{th}$ node performs a receiving operation, and the $j^{th}$ node performs a transmitting operation as shown in FIG. 8A.

FIG. 8B illustrates slot-specific resource allocation for a fully connected link configuration between four nodes in the SDD-based transmission scheme. Referring to FIG. 8B, wireless resources divided between the two slots are used for bidirectional communication for any arbitrary pair of nodes during the specific time section.

Figure 9A:
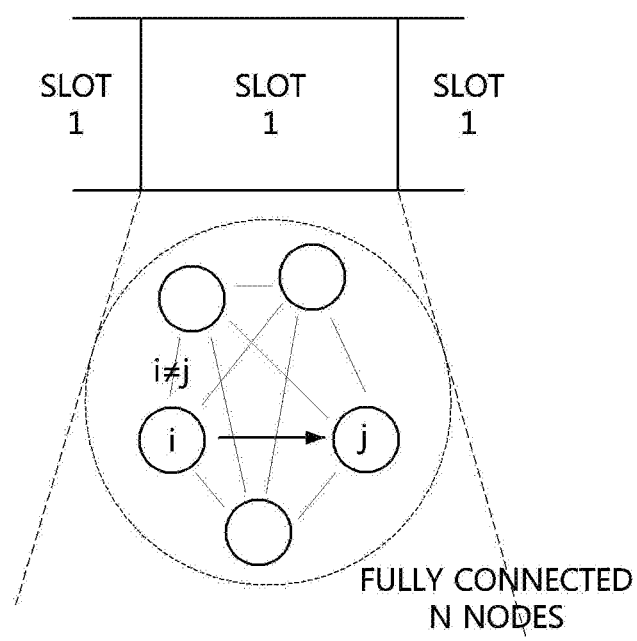
FIG. 9A is a diagram conceptually illustrating a resource allocating method in an IBFD-based transmission scheme according to an embodiment of the present invention.
Figure 9B:
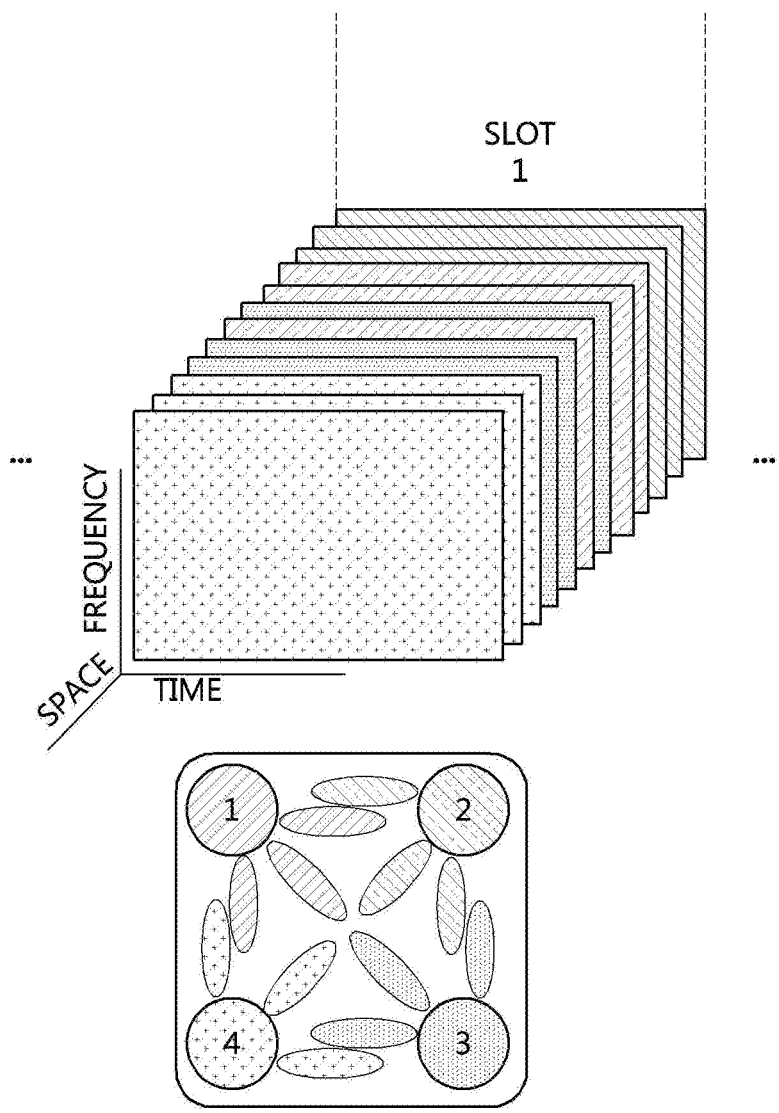
FIG. 9B is a diagram illustrating resources allocated for each slot in an IBFD-based transmission scheme according to an embodiment of the present invention.

FIG. 9A is a diagram conceptually illustrating a resource allocating method in an IBFD-based transmission scheme according to an embodiment of the present invention, and FIG. 9B is a diagram illustrating resources allocated for each slot in an IBFD-based transmission scheme according to the embodiment of the present invention.

N nodes constituting a fully connected link each have a different index among integers greater than or equal to 1 and less than or equal to N.

Referring to FIG. 9A, in the IBFD-based transmission scheme, only one slot exists within a specific time section. In an arbitrary slot, when an $i^{th}$ node among the N nodes constituting the fully connected link has an index different from an index of a $j^{th}$ node, the $i^{th}$ node performs a transmitting operation and the $j^{th}$ node performs a receiving operation as shown in FIG. 9A.

FIG. 9B illustrates a resource allocating method for a fully connected link configuration between four nodes in an IBFD-based transmission scheme. Each node establishes a transmitting and receiving relation with all the other nodes in the link.

Figure 10:
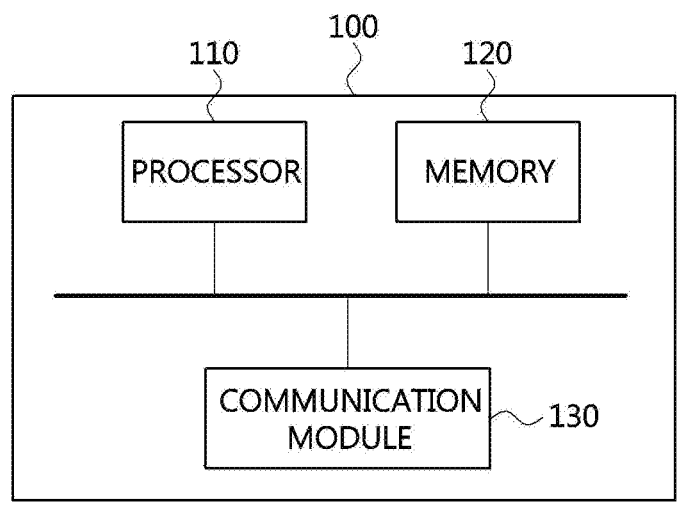
FIG. 10 is a block diagram illustrating a configuration of a wireless communication device according to an embodiment of the present invention.

FIG. 10 is a block diagram illustrating a configuration of a wireless communication device 100 according to an embodiment of the present invention.

The wireless communication device 100 according to the embodiment of the present invention may operate as one node in a wireless network and constitute a fully connected link in connection with one or more other devices. The wireless communication device 100 may include a processor 110 and a memory 120 for storing at least one command to be executed through the processor 110. In addition, the wireless communication device 100 may include a communication module 130 for communication with another device.

The at least one command may include a command for receiving network information from the wireless communication network, a command for receiving information about a transmission scheme to be used for the communication with another device, a command for obtaining information about another device and an index of the wireless communication device, and a command for allocating resources to be used for transmission and reception with another device using information related to at least one of the transmission scheme, the information about another device, and the index of the wireless communication device.

In other words, the wireless communication device according to the present invention may determine a transmitting node and a receiving node and allocate wireless resources on the basis of a function or a conditional expression, which are previously defined according to indexes of nodes and a transmission scheme.

The operations of the methods according to the embodiments may be embodied as computer-readable programs or codes on a computer-readable recording medium. The computer-readable recording medium is any data storage device that can store data that can be thereafter read by a computer system. In addition, the computer-readable recording medium may also be distributed over network-coupled computer systems so that the computer-readable program or code is stored and executed in a distributed fashion.

In addition, the computer-readable recording medium may include a hardware device specially constructed to store and execute a program instruction, for example, a read-only memory (ROM), a random-access memory (RAM), and a flash memory. The program instruction may include a high-level language code executable by a computer through an interpreter in addition to a machine language code made by a compiler.

Some aspects of the present invention have been described in the context of the apparatus, but may represent description of a method corresponding thereto, and a block or an apparatus correspond to an operation of a method or a feature thereof. Similarly, some aspects having been described in the context of the method may also be represented by a block or items corresponding to the method or a feature of an apparatus corresponding to the method. All or some of the operations of the method may be performed, for example, by (or using the hardware device) the hardware device, such as a microprocessor, a programmable computer, or an electronic circuit. In some embodiments, one or more of most important operations of the method may be performed by such a device.

In some embodiments, a programmable logic device (for example, a field programmable gate array) may be used to perform some or all of the above described functions of the methods. In some embodiments, a field programmable gate array may operate together with a microprocessor to perform one of the above described methods. In an implementation, the methods may be performed by any hardware device.

As should be apparent from the above, the wireless resource allocating method according to the embodiments of the present invention can provide a network architecture efficient for a wireless backhaul of a network that uses millimeter waves.

The wireless resource allocating method according to the embodiments of the present invention can provide a transmission method efficiently operating in a backhaul of a wireless network using millimeter waves.

Although the exemplary embodiments of the present invention have been described in detail, it should be understood that various substitutions, additions, and modifications are possible without departing from the scope and spirit of the present invention, and the scope of the present invention is limited by the claims and the equivalents thereof.

What is claimed is:

1. A resource allocating method in a wireless network performed by a first device positioned in a wireless communication network and connected to one or more second devices to constitute a fully connected link, the resource allocating method comprising:
   receiving network information from the wireless communication network;
   receiving information about a transmission scheme to be used for communication between the first device and the second device from the network information;
   obtaining information about the second device and an index of the first device; and
   allocating resources to be used for communication between the first device and the one or more second devices using information related to at least one of the transmission scheme, the information about the second device, and the index of the first device.

2. The resource allocating method of claim 1, wherein the allocating of the resources to be used for the communication between the first device and the one or more second devices includes:
   determining a number of slots to be included in a unit time section using at least one of the transmission scheme and a total number of nodes constituting the fully connected link; and
   determining whether the first device operates as a transmitting node or a receiving node in each slot in the unit time section using at least one of the transmission scheme, the information about the second device, and the index of the first device.

3. The resource allocating method of claim 1, wherein the transmission scheme includes at least one of a broadcast channel (BC)-based transmission scheme, a multiple access channel (MAC)-based transmission scheme, a K-user interference channel (K-User IC)-based transmission scheme, a space division duplex (SDD)-based transmission scheme, and an in-band full duplex (IBFD)-based transmission scheme.

4. The resource allocating method of claim 3, wherein the allocating of the resources to be used for the communication between the first device and the one or more second devices includes, with respect to the BC-based transmission scheme:
   setting a number of slots included in a unit time section to be equal to a total number of nodes constituting the fully connected link; and
   setting the first device to operate as a transmitting node in a slot having the same index as an index of the first device and operate as a receiving node in remaining slots in the unit time section.

5. The resource allocating method of claim 3, wherein the allocating of the resources to be used for the communication between the first device and the one or more second devices includes, with respect to the MAC-based transmission scheme:
   setting a number of slots included in a unit time section to be equal to a total number of nodes constituting the fully connected link; and
   setting the first device to operate as a receiving node in a slot having the same index as an index of the first device and operate as a transmitting node in remaining slots in the unit time section.

6. The resource allocating method of claim 3, wherein the allocating of the resources to be used for the communication between the first device and the one or more second devices includes, with respect to the K-User IC-based transmission scheme:
  setting a number of slots included in a unit time section to be equal to a number of cases in which K nodes are selected from all nodes constituting the fully connected link; and
  setting, when the index of the first device is included in a combination of selecting the K nodes among all the nodes constituting the fully connected link, the first device to operate as a transmitting node in a slot having the same index as an index allocated to a group to which the device belongs among the combination and operates as a receiving node in remaining slots.

7. The resource allocating method of claim 6, wherein K devices operate as transmitting nodes in one slot according to the K-User IC-based transmission scheme.

8. The resource allocating method of claim 3, wherein the allocating of the resources to be used for the communication between the first device and the one or more second devices includes, with respect to the SDD-based transmission scheme:
  setting two slots including a first slot and a second slot in a unit time section; and
  setting the first device to operate as a transmitting node in the first slot or the second slot depending on whether the index of the first device is larger than an index of the second device or not.

9. The resource allocating method of claim 8, wherein the setting of the first device to operate as a transmitting node in the first slot or the second slot includes:
  setting the first device to operate as a transmitting node when the index of the first device is smaller than the index of the second device in the first slot; and
  setting the first device to operate as a receiving node when the index of the first device is smaller than the index of the second device in the second slot.

10. The resource allocating method of claim 3, wherein the allocating of the resources to be used for the communication between the first device and the one or more second devices includes, with respect to the IBFD-based transmission scheme:
  setting a single slot in a unit time section; and
  setting the first device to operate as a transmitting and receiving node with respect to all of the one or more second devices in the slot.

11. A wireless communication device positioned in a wireless communication network and connected to one or more other devices to constitute a fully connected link, the wireless communication device comprising:
  a processor; and
  a memory configured to store at least one command to be executed through the processor,
  wherein the at least one command includes:
    a command for receiving network information from the wireless communication network;
    a command for receiving information about a transmission scheme to be used for a communication with the other device from the network information;
    a command for obtaining information about the other device and an index of the wireless communication device; and
    a command for allocating resources to be used for communication with the other device using information related to at least one of the transmission scheme, the information about the other device, and the index of the wireless communication device.

12. The wireless communication device of claim 11, wherein the command for allocating the resources to be used for the communication with the other device includes:
  a command for determining a number of slots to be included in a unit time section using at least one of the transmission scheme and a total number of nodes constituting the fully connected link; and
  a command for determining whether the wireless communication device operates as a transmitting node or a receiving node in each slot in the unit time section using at least one of the transmission scheme, the information about the other device, and the index of the wireless communication device.

13. The wireless communication device of claim 11, wherein the transmission scheme includes at least one of a broadcast channel (BC)-based transmission scheme, a multiple access channel (MAC)-based transmission scheme, a K-user interference channel (K-User IC)-based transmission scheme, a space division duplex (SDD)-based transmission scheme, and an in-band full duplex (IBFD)-based transmission scheme.

14. The wireless communication device of claim 13, wherein the command for allocating the resources to be used for the communication with the other device includes, with respect to the BC-based transmission scheme:
  a command for setting a number of slots included in a unit time section to be equal to a total number of nodes constituting the fully connected link; and
  a command for setting the wireless communication device to operate as a transmitting node in a slot having the same index as an index of the wireless communication device and operate as a receiving node in remaining slots in the unit time section.

15. The wireless communication device of claim 13, wherein the command for allocating the resources to be used for the communication with the other device includes, with respect to the MAC-based transmission scheme:
  a command for setting a number of slots included in a unit time section to be equal to a total number of nodes constituting the fully connected link; and
  a command for setting the wireless communication device to operate as a receiving node in a slot having the same index as an index of the wireless communication device and operate as a transmitting node in remaining slots in the unit time section.

16. The wireless communication device of claim 13, wherein the command for allocating the resources to be used for the communication with the other device includes, with respect to the K-User IC-based transmission scheme:
  a command for setting a number of slots included in a unit time section to be equal to a number of cases in which K nodes are selected from all nodes constituting the fully connected link; and
  a command for setting, when the index of the wireless communication device is included in a combination of selecting the K nodes among all the nodes constituting the fully connected link, the wireless communication device to operate as a transmitting node in a slot having the same index as an index allocated to a group to which the device belongs among the combination and operates as a receiving node in remaining slots, wherein K devices operate as transmitting nodes in a single slot according to the K-User IC-based transmission scheme.

17. The wireless communication device of claim 13, wherein the command for allocating the resources to be used for the communication with the other device includes, with respect to the SDD-based transmission scheme:
- a command for setting two slots including a first slot and a second slot in a unit time section; and
- a command for setting the wireless communication device to operate as a transmitting node in the first slot or the second slot depending on whether the index of the wireless communication device is larger than an index of the other device or not.

18. The wireless communication device of claim 17, wherein the command for setting the wireless communication device to operate as a transmitting node in the first slot or the second slot includes:
- a command for setting the wireless communication device to operate as a transmitting node when the index of the wireless communication device is smaller than the index of the other device in the first slot; and
- a command for setting the wireless communication device to operate as a receiving node when the index of the wireless communication device is smaller than the index of the other device in the second slot.

19. The wireless communication device of claim 13, wherein the command for allocating the resources to be used for the communication with the other device includes, with respect to the IBFD-based transmission scheme:
- a command for setting a single slot in a unit time section; and
- a command for setting the wireless communication device to operate as a transmitting and receiving node with respect to all of the one or more other devices in the slot.

20. The wireless communication device of claim 11, wherein the wireless communication device includes at least one of a terminal, a base station, and a relay.

* * * * *